Dec. 31, 1957   E. R. McELHOE   2,818,277
TRAILER HITCHES
Filed Dec. 16, 1955

INVENTOR.
EARL R. McELHOE
BY Ralph W. Kalish

ATTORNEY

United States Patent Office 2,818,277
Patented Dec. 31, 1957

2,818,277
TRAILER HITCHES

Earl R. McElhoe, Plymouth, Ill., assignor to Advanced Products Company, Inc., Plymouth, Ill., a corporation of Illinois Application December 16, 1955, Serial No. 553,678

10 Claims. (Cl. 280—491)

This invention relates in general to draft devices, and more particularly, to trailer hitches for use in the coupling of towing and towed vehicles.

Heretofore, numerous trailer hitches have been developed for engaging a house trailer or van trailer to a passenger automobile or truck, but invariably, such hitches have either been welded to suitable frame portions of the towing vehicle becoming a permanent part thereof or have been secured by bolts and like fasteners. In each instance such mountings occasion an alteration in the frame structure with possible weakening thereof in the case of drilling bolt-receiving openings. Furthermore, in installing hitches of that character on vehicles, skilled labor is requisite for initially modifying the frame structure. In the case of bolt-attached hitches, tools, such as wrenches and the like, must be utilized to secure or remove the hitches from the towing vehicle.

Therefore, it is an object of the present invention to provide a trailer hitch which is adapted for engagement upon conveniently located parts of the vehicle body without requiring the utilization of tools or any modification of the vehicle structure.

It is a further object of the present invention to provide a trailer hitch which is adapted for clamping engagement upon portions of the towing vehicle frame and incorporating readily operable locking means for reliably maintaining said hitch in clamped relationship upon the vehicle.

It is an additional object of the present invention to provide a trailer hitch which may be readily installed upon, or removed from, a towing vehicle without the exercise of skill and hence, effectively usable by the average motorist.

It is a further object of the present invention to provide a trailer hitch which is self-contained, not requiring any extraneous, easily displaceable parts; which is rugged and durable in usage; which is compact for ready portability and storage in minimum space; and which may be economically manufactured.

These and other detailed objects are obtained by the structures illustrated in the accompanying drawing (one sheet) in which—

Figure 1:
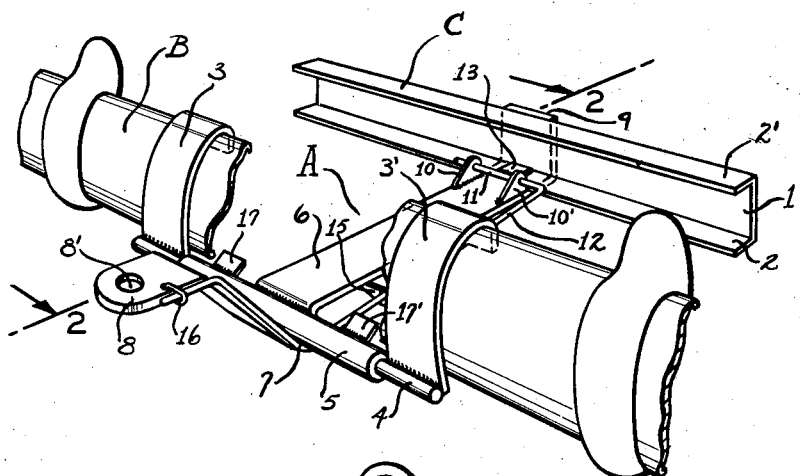
Figure 1 is a perspective view of a trailer hitch constructed in accordance with and embodying the present invention, showing the hitch in mounted position upon elements of a vehicle.

Referring now by reference characters to the drawings, A designates a trailer hitch for use on a towing vehicle, such as a passenger automobile or truck having a conventional rear bumper B and rear frame or transverse member C, which latter are shown in the drawings in their relative positions for purposes of illustration; said frame member C being of channel form with its web 1 presented vertically and forwardly or toward the front end of the vehicle, and its flanges 2, 2' directed rearwardly and vertically spaced. Trailer hitch A comprises a pair of spaced hanger arms 3, 3' having hooks formed at their upper ends for engagement upon the upper edge of bumper B; said arms 3, 3' having a curvature conforming to the vertical contour of bumper B for fitted disposition thereon. At their lower ends hanger arms 3, 3' are rigidly secured, as by welding, to the projecting ends of a rod 4, which extends through a sleeve 5 having an inside diameter greater than the outside diameter of rod 4 so that the same may be relatively rotatable. Sleeve 5 is of slightly less length than the distance between hanger arms 3, 3', to be detainingly abuttable against same for preventing any undue lengthwise shifting movement thereof. Fixed to sleeve 5 is a draw bar 6, which, adjacent its normally outer end, or that toward the vehicle rearward end, is transversely depressed to form a trough 7 wherein sleeve 5 is secured in substantially axial perpendicular relationship to said bar. In its outer end portion, bar 6 defines a tongue 8 having an eye 8' for receiving a customary hitch element (not shown). The normally inner end portion of draw bar 6 is relatively elongated and at its end extremity is turned upwardly to present abutment 9, in planarwise perpendicular relationship to the adjacent portion of bar 4, and of an extent substantially equal to the width of web 1 of frame member C for disposition against the forwardly directed face thereof when hitch A is in operative position, as will be discussed more fully hereinbelow.

Mounted upon the upper face of bar 6, proximate abutment 9, is a pair of transversely spaced, parallel bearings 10, 10' for journaling the inner end, shaft-forming portion 11 of an operating, rod-like arm 12. Welded, or otherwise mounted on shaft-forming portion 11 for swingable movement toward and away from bar 6 upon rotation thereof is a generally rectangular, clamping plate 13 of such length as to have its free side edge spaced from abutment 9 a distance substantially equal to the thickness of web 1, when said plate 13 is in downwardly rocked position (see Figure 1). The portion of bar 6 between bearings 10, 10' and abutment 9, as indicated at 14, coacts with plate 13 in the manner of a stationary jaw to define therewith a clamp for gripping the lower flange 2 of bumper C for maintaining hitch A reliably mounted upon the towing vehicle.

Said operating arm 12 outwardly of bearing 10 is bent in crank fashion for extension rearwardly in substantially corresponding profile with bar 6 and laterally thereof, having a downwardly curved portion for extension beneath sleeve 5 and being thence turned upwardly, with its outer end terminating short of the end of tongue 8. Rigid on bar 6 and projecting from the side edge thereof proximate arm 12 is a cradle or keeper 15 for receiving on its upper surface said arm 12 to support same against unauthorized downward swinging, whereby said keeper 15 acts as a detent. The forward end of arm 12 may be engaged by a loop-forming element 16 mounted on tongue 8 so as to prevent unauthorized lateral or outward movement of arm 12 when in locked position so that undesired dislodgement of arm 12 from cradle 15 will be assured, as will be described.

Radially projecting from the normally upward side portion of sleeve 5 and adjacent the opposite ends thereof is a pair of short, aligned dogs 17, 17', presented in a plane which defines an angle of less than 90° with the plane of the inner portion of bar 6, whereby the same will be inclined upwardly and inwardly or forwardly of the vehicle, when the hitch A is in mounted position.

Figure 2:
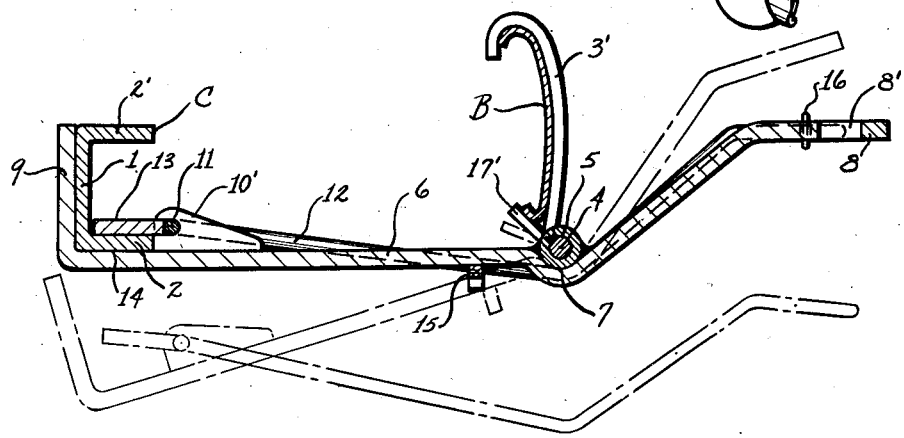
Figure 2 is a vertical transverse sectional view taken on the line 2—2 of Figure 1, showing the hitch in unlocked position in dotted lines.

In order to install or mount trailer hitch A upon a vehicle, hanger arms 3, 3' are hookingly engaged upon bumper B in which position sleeve 5 will be presented slightly rearwardly of, and beneath said bumper B. In its initial position trailer hitch A will expectedly assume the position shown in dotted lines in Figure 2 since the normally inner end of bar 6 will, through gravity, hang downwardly with attendant rotation of sleeve 5 about the now stationary rod 4. Operating arm 12 will be swingable independently of bar 6, as the same will not be engaged within eyelet 16 and cradle 15. The inner end portion of bar 6 will then be manually swung upwardly, with return rotative movement of sleeve 5, so as to receive lower flange 2 of frame member C upon bar portion 14, with abutment 9 being in surfacewise contact on its rearward face with the forward face of web 1. By such upward swinging of the inner end of bar 6, tongue 8 will be rocked downwardly to assume operative position, and dogs 17, 17' will be brought upwardly against the lower forward face of bumper B, the latter thereby being engaged between dogs 17, 17' and hanger arms 3, 3' rendering hitch A stable thereon, fully resistant to undesired shifting. The central portion of the lower edge of bumper B is immediately adjacent or contiguous with the outer face of sleeve 5. Since arm 12 is freely swingable the same will remain in downward position as the inner portion of bar 6 is brought upwardly. Thereon the outer end of said arm 12 will be gripped and pulled upwardly to thereby cause clamping plate 13 to be brought downwardly into clamping disposition upon the portion of frame member flange 2 received upon bar portion 14. The reception of arm 12 in cradle 15 will assure the constant imposition of maximum pressure by said plate 13 on flange 2 and serve to maintain arm 12 in thus locked position. Eyelet 16 may then be slipped over the forward end of arm 12 to retain the forward end immediately adjacent tongue 8 and further insure against any inadvertent unlocking action.

As thus lockingly mounted upon a towing vehicle, it will be seen that hitch A is secure thereupon and so rigidly mounted as to provide a stable and sturdy draft device for the trailer to be drawn. Frame member C is clamped between plate 13 and bar portion 14 with web 1 being received between the outer edge of plate 13 and the inner face of abutment 9; said abutment 9, being of substantially the same height as frame C, engages same over a relatively broad area for effectively dissipating any axially developed forces in bar 6 by the towing operation, so that frame member C will not become distorted thereunder and hitch A will be resistant to accidental lengthwise shifting. Furthermore, as described above, hitch A is rendered additionally firm by the engagement of hanger arms 3, 3' and dogs 17, 17' with bumper B.

In order to demount or remove hitch A, the user need only disengage the forward end of arm 12 from eyelet 16 and withdraw same from cradle 15 to allow arm 12 to drop downwardly with subsequent upward swinging or clamp-opening movement, of plate 13 from engagement upon frame flange 2, whereupon the inner end portion of bar 6 is liberated for free downward swinging about rod 4 into disengaged position, which action will cause dogs 17, 17' to be moved away from bumper B. Thus, the only remaining step is to lift hanger arms 3, 3' from bumper B to complete the operation.

It will thus be seen that the hitch of the present invention does not require the utilization of any tools for affixation to, or removal from, the towing vehicle; that the same is uniquely adapted to engage conveniently located portions of the vehicle in a most stable manner; and that the portions of the vehicle are in no way damaged or distorted by such engagement.

Hitch A is thus a self-contained, integrated unit, independent of any extraneous, readily displaceable elements, and may be easily used by the average motorist. When demounted, hitch A is compact and thereby readily portable and storable in minimum space.

Figure 3:
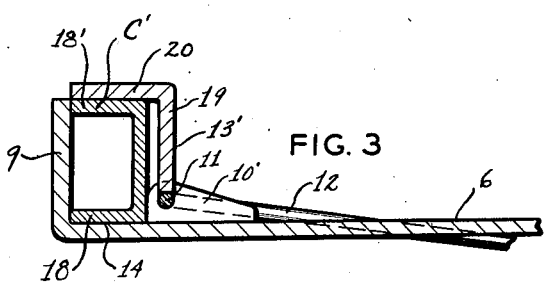
Figure 3 is a fragmentary view taken substantially along the line 2—2 of Figure 1 illustrating another form of clamping member 1.

Referring now to Figure 3, there is shown a modified type of clamping member for use with vehicle rear frames C' which may be either of box construction (not shown), or of channel form wherein the web 1 is presented rearwardly and the vertically spaced flanges 18, 18' are directed forwardly of the vehicle. For this type of frame member C' an angulated clamping member 13' is rigidly mounted on the shaft forming portion 11 of operating arm 12, having a normally vertical section 19 and upper horizontal section 20. Thus, upon shifting operating arm 12 into locked position the horizontal section 20 will be disposed snugly upon the upper face of upper flange 18, whereby frame member C will be clamped between same and the cooperating portion 14 of bar 6. It is readily understandable that if a frame member C' is of box cross section clamping member 13' will operate in the same manner having horizontal section 20 engaging the top surface thereof.

In view of the above, it is obvious that trailer hitch A is readily adaptable for use with frame members of varying cross sectional design as encountered in vehicles of current make.

It should be understood that changes and modifications in the formation, construction, arrangement, and combination of the several parts of the trailer hitch may be made and substituted for these herein shown and described without departing from the nature and principle of my invention.

Having thus described my invention, what I claim and desire to secure by Letters Patent is:

1. For use with a towing vehicle having a rear bumper and frame member, a trailer hitch comprising a pair of spaced arms for engagement on said bumper, a rod secured at its ends to the lower ends of arms, a draw bar, means for swingably mounting said draw bar on said rod, clamping means provided on the normally inner end portion of said draw bar for engagement on opposed horizontally parallel surfaces of said vehicle frame member, and an abutment provided on said draw bar for engagement on a vertical surface of said frame member.

2. For use with a towing vehicle having a rear bumper and frame member, a trailer hitch comprising a pair of spaced arms for engagement on said bumper, a rod secured at its ends to the lower ends of arms, a draw bar, means for swingably mounting said draw bar on said rod, a sleeve member disposed on said rod for relative rotation thereon, a draw bar fixed to said sleeve, clamping means provided on the normally inner end portion of said draw bar for engagement on opposed horizontally parallel surfaces of said vehicle frame member, and an abutment provided on said draw bar for engagement on a vertical surface of said frame member.

3. For use with a towing vehicle having a rear bumper and frame member, a trailer hitch comprising a pair of spaced arms for engagement on said bumper, a rod secured at its ends to the lower ends of said arms, a draw bar, means for swingably mounting said draw bar on said rod said draw bar extending at its inner end beneath the bottom surface of the frame member for abutment thereagainst when said draw bar is in upward rocked position at its inner end, a clamping plate rockably mounted on said draw bar along an axis transversely thereof for swingable movement toward and away from said inner end portion of the draw bar for cooperating therewith for clamped engagement on said frame member, and locking means for maintaining said clamping plate in operative relationship on said draw bar portion.

4. For use with a towing vehicle having a rear bumper and frame member, a trailer hitch comprising a pair of spaced arms for engagement on said bumper, a rod secured at its ends to the lower ends of said arms, a draw bar, means for swingably mounting said draw bar on said rod said draw bar extending at its inner end beneath the bottom surface of the frame member for abutment thereagainst when said draw bar is in upward rocked position at its inner end, spaced bearing member provided on said draw bar adjacent its inner end and projecting upwardly thereof on opposite sides of said draw bar, a shaft section journaled in said bearing members, a clamping plate rigid on said shaft section for swingable movement toward and away from the upper surface of said inner end portion of the draw bar for cooperating therewith for clamped engagement on said frame member, an arm extending from said shaft section for facilitating operation thereof, and means for locking said arm to maintain said clamping plate in operative relationship on said draw bar portion.

5. A trailer hitch as described in claim 4 wherein the inner end extremity of said draw bar is bent from the plane of said bar to provide an abutment for surfacewise contact with one vertical face of said frame member.

6. For use with a towing vehicle having a rear bumper and frame member, a trailer hitch comprising a pair of spaced arms adapted for suspension on said bumper, a rod extending between said arms and fixed at its ends to the lower ends of said arms below said bumper, a draw bar, a sleeve-forming member disposed on said rod for rotative movement thereon, said draw bar being secured to said sleeve-forming member at a point between the ends of said bar, said draw bar extending at its inner end beneath the bottom surface of the frame member for abutment thereagainst when said draw bar is in upward rocked position at its inner end a clamping plate swingably mounted on the normally inner end portion of said bar for engagement on said frame member on a surface parallel to the bottom surface thereof whereby the same may be clampingly retained between said clamping plate and the inner end portion of the draw bar, and locking plate for maintaining said clamping means in operative position.

7. For use with a towing vehicle having a rear bumper and frame member, a trailer hitch comprising a pair of spaced arms adapted for suspension on said bumper, a rod extending between said arms and fixed at its ends to the lower ends of said arms below said bumper, a draw bar, a sleeve-forming member disposed on said rod for rotative movement thereon, said draw bar being secured to said sleeve-forming member at a point between the ends of said bar said draw bar extending at its inner end beneath the bottom surface of the frame member for abutment thereagainst when said draw bar is in upward rocked position at its inner end, a clamping plate swingably mounted on the normally inner end portion of said bar with its pivot axis extending transversely of said bar and spacedly thereabove whereby said clamping plate may engage on its under side a surface of the frame member parallel to bottom surface thereof for cooperating with the inner end portion of said bar for clamped relationship on said frame member, and an abutment member provided on the inner end extremity of said bar for surface-wise engagement with the forwardly directed face of said frame member.

8. A trailer hitch as described in claim 3 wherein the clamping plate is angulated for engaging a portion of the frame member located upwardly of the axis of rotation of said clamping plate.

9. A trailer hitch as described in claim 3 wherein the clamping plate is flat.

10. A trailer hitch as described in claim 7 wherein bearings are provided on said draw bar, a shaft section journalled in said bearings, said clamping plates being fixed on said shaft section, an extension provided on said shaft section outwardly of one bearing and means for engaging said extension for locking said shaft section against rotation to maintain said clamping plate in operative position.

References Cited in the file of this patent
UNITED STATES PATENTS

| | | |
|---|---|---|
| 2,575,171 | Hulse | Nov. 13, 1951 |
| 2,733,936 | Tate | Feb. 7, 1956 |
| 2,745,681 | Kitterman | May 15, 1956 |